US005128902A

United States Patent [19]

Spinnler

[11] Patent Number: 5,128,902

[45] Date of Patent: Jul. 7, 1992

[54] ELECTROMECHANICAL TRANSDUCER FOR ACOUSTIC TELEMETRY SYSTEM

[75] Inventor: Ralph F. Spinnler, Glastonbury, Conn.

[73] Assignee: Teleco Oilfield Services Inc., Meriden, Conn.

[21] Appl. No.: 604,952

[22] Filed: Oct. 29, 1990

[51] Int. Cl.[5] ........................ G01V 1/40; H04R 17/00

[52] U.S. Cl. ........................ 367/82; 367/155; 367/157

[58] Field of Search ............... 367/153, 154, 155, 164, 367/82, 157; 310/328, 331

[56] References Cited

U.S. PATENT DOCUMENTS

| | | | |
|---|---|---|---|
| 3,100,291 | 8/1963 | Abbott | 310/337 |
| 3,187,207 | 6/1965 | Tomes | 310/325 |
| 4,146,806 | 3/1979 | Katsumata | 310/153 |
| 4,283,780 | 8/1981 | Nardi | 367/82 |
| 4,302,826 | 11/1981 | Kent et al. | 367/82 |
| 4,347,593 | 8/1982 | Trott | 367/164 |
| 4,477,783 | 10/1984 | Glenn | 310/325 |
| 4,499,566 | 2/1985 | Abbott | 367/155 |

*Primary Examiner*—Ian J. Lobo
*Attorney, Agent, or Firm*—Fishman, Dionne & Cantor

[57] ABSTRACT

An improved electromechanical transducer is provided for use in an acoustic telemetry system. The transducer of this invention comprises a stack of ferroelectric ceramic disks interleaved with a plurality of spaced electrodes which are used to electrically pole the ceramic disks. The ceramic stack is housed in a metal tubular drill collar segment. Thick metal spacer plate are selectively sandwiched between electrodes in order to promote thermal cooling of the ceramic stack. In accordance with an important feature of this invention, the thick metal spacer plates are comprised of a material (such as copper alloys, aluminum alloys or the like) which is softer than the relatively hard, brittle ceramic disks thus reducing the stresses upon the disks when the assembly is subjected to bending, torsion and the like, and thereby minimizing the risk of structural failure of the disks when in operation within a downhole acoustic signal generator.

3 Claims, 12 Drawing Sheets

ELECTROMECHANICAL TRANSDUCER FOR ACOUSTIC TELEMETRY SYSTEM

CROSS-REFERENCE TO RELATED APPLICATION

This application is related to U.S. application Ser. No. 605,084 filed contemporaneously herewith entitled "Electromechanical Transducer for Acoustic Telemetry System" invented by Douglas S. Drumheller (Attorney Docket No. 89-1392).

BACKGROUND OF THE INVENTION

This invention relates generally to a system for transmitting data along a drillstring, and more particularly to a system for transmitting data through a drillstring by modulation of intermediate-frequency acoustic carrier waves.

Deep wells of the type commonly used for petroleum or geothermal exploration are typically less than 30 cm (12 inches) in diameter and on the order of 2 km (1.5 miles) long. These wells are drilled using drillstrings assembled from relatively light sections (either 30 or 45 feet long) of drill pipe that are connected end-to-end by tool joints, additional sections being added to the uphole end as the hope deepens. The downhole end of the drillstring typically includes a drill collar, a weight assembled from sections of relatively heavy lengths of uniform diameter collar pipe having an overall length on the order of 300 meters (1000 feet). A drill bit is attached to the downhole end of the drill collar, the weight of the collar causing the bit to bite into the earth as the drillstring is rotated from the surface. Sometimes, downhole mud motors or turbines are used to turn the bit. Drilling mud or air is pumped from the surface to the drill bit through an axial hole in the drillstring. This fluid removes the cuttings from the hole, provides a hydrostatic head which controls the formation gases, provides a deposit on the wall to seal the formation, and sometimes provides cooling for the bit.

Communication between downhole sensors of parameters such as pressure or temperature and the surface has long been desirable. Various methods that have been tried for this communication include electromagnetic radiation through the ground formation, electrical transmission through an insulated conductor, pressure pulse propagation through the drilling mud, and acoustic wave propagation through the metal drillstring. Each of these methods has disadvantages associated with signal attenuation, ambient noise, high temperatures and compatibility with standard drilling procedures.

The most commercially successful of these methods has been the transmission of information by pressure pulse in the drilling mud. However, attenuation mechanisms in the mud limit the transmission rate to less than 1 bit per second.

This invention is directed towards the acoustical transmission of data through the metal drillstring. The history of such efforts is recorded in columns 2-4 of U.S. Pat. No. 4,293,936, issued Oct. 6, 1981, of Cox and Chaney. As reported therein, the first efforts were in the late 1940's by Sun Oil Company, which organization concluded there was too much attenuation in the drillstring for the technology at that time. Another company came to the same conclusion during this period.

U.S. Pat. No. 3,252,225, issued May 24, 1966, of E. Hixon concluded that the length of the drill pipes and joints had an effect on the transmission of energy up the drillstring. Hixon determined that the wavelength of the transmitted data should be greater than twice and preferably four times the length of a section of pipe.

In 1968 Sun Oil tried again, using repeaters spaced along the drillstring and transmitting the best frequency range, on with attenuation of only 10 dB/1000 feet. A paper by Thomas Barnes et al., "Passbands for Acoustic Transmission in an Idealized Drillstring", Journal of Acoustical Society of America, Vol. 51, No. 5, 1972, pages 1606–1608, was consulted for an explanation of the field-test results, which were not totally consistent with the theory. Eventually, Sun went back to random searching for the best frequencies for transmission, an unsuccessful procedure.

The aforementioned Cox and Chaney patent concluded from their interpretation of the measured data obtained from a field test in a petroleum well that the Barnes model must be in error, because the center of the passbands measured by Cox and Chaney did not agree with the predicted passbands of Barnes et al. The patent uses acoustic repeaters along the drillstring to ensure transmission of a particular frequency for a particular length of drillpipe to the surface.

U.S. Pat. No. 4,314,365 , issued Feb. 2, 1982, of C. Petersen et al discloses a system similar to Hixon for transmitting acoustic frequencies between 290 Hz and 400 Hz down a drillstring.

U.S. Pat. No. 4,390,975, issued Jun. 28, 1983, of E. Shawhan, noted that ringing in the drillstring could cause a binary "zero" to be mistaken as a "one". This patent transmitted data, and then a delay to allow the transients to ring down before transmitting subsequent data.

U.S. Pat. No. 4,562,559, issued Dec. 31, 1985, of H.E. Sharp et al, uncovered the existence of "fine structure" within the passbands; e.g., "such fine structure is in the nature of a comb with transmission voids or gaps occurring between teeth representing transmission bands, both within the overall passbands." Sharp attributed this structure to "differences in pipe length, conditions of tool joints, and the like." The patent proposed a complicated phase shifted wave with a broader frequency spectrum to bridge these gaps.

The present invention is based upon a more thorough consideration of the underlying theory of acoustical transmission through a drillstring. For the first time, the work of Barnes et al, has been analyzed as a banded structure of the type discussed by L. Brillouin, Wave Propagation in Periodic Structures, McGraw-Hill Book Co., New York, 1946. The theoretical results of this invention have also been correlated to extensive laboratory experiments on scale models of the drillstring, and the original data tape obtained from Cox and Chaney's field test has been reanalyzed. This analysis shows that Cox and Chaney's measurements contain data which, in fact, is in excellent agreement with the theoretical predictions of Barnes and this invention; that Sharp misinterpreted the cause of the fine structure; and that the ringing and frequency limitations cited by Shawhan and Hixon are easily overcome by signal processing.

FIG. 1 shows some of the results of the new analysis of the data recorded by Cox and Chaney. This FIGURE is a plot of the power amplitude versus frequency of the transmitted signal. The theoretical boundaries between the passbands and the stopbands are shown by the vertical dotted lines. If this FIGURE is compared to FIG. 1 in Cox and Chaney's patent significant and obvious differences can be noted. These are attributable to error in Cox and Chaney's signal analysis. Furthermore, FIG. 1 of this invention also shows the "fine structure" of Sharp et al. From the analysis of this invention we now know that this fine structure is caused by echoes bouncing between opposite ends of the drillstring, the number of peaks being correlated to the number of sections of drillpipe. A theoretical calculation of this field test was used to produce FIG. 2. All of the phenomena important to the transmission of data in the drillstring is represented in this calculation. These theoretical results accurately predict the location of the passbands and the fine structure produced by the echo phenomena.

SUMMARY OF THE INVENTION

It is an object of this invention to provide apparatus and method for transmitting data along a drillstring by use of a modulated continuous acoustical carrier wave (waves) which is (are) centered within one (several) of the passbands of the drillstring.

It is further object of this invention to provide a method for transmission at carrier frequencies which are on the order of several hundreds to several thousands of Hertz in order to minimize the interference by the noise which is generated by the drilling process.

It is an additional object of this invention to provide a system for suppressing the transmission of noise within the transmission band or bands.

It is another object of this invention to provide a system for suppressing echoes from the ends of the drillstring.

It is still another object of this invention to provide a system for preconditioning acoustical data for transmission through a passband having characteristics determined by the parameters of the drillstring.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise transmitting means for coupling data to a drillstring near a first end of said drillstring for acoustical transmission to a second end of said drillstring; anti-noise means near the first end of said drillstring to be the second end; and receiving means near the second end for receiving the acoustically transmitted data.

In addition, the invention may further comprise a method comprising the steps of preconditioning the data to counteract distortions caused by the drillstring, the distortions corresponding to the effects of multiple passbands and stopbands having characteristics dependent upon the properties of the drillstring, applying the preconditioned data to a first end of the drillstring; and detecting the data at a second end of the drillstring.

In a preferred embodiment of the present invention, a novel digital time delay circuit is utilized which employs an array of First-in-First-out (FiFo) microchips. Also, a bandpass filter is used at the input to this circuit for isolating drilling noise and eliminating high frequency output.

In accordance with still another feature of the present invention, an improved electromechanical transducer is provided for use in an acoustic telemetry system. The transducer of this invention comprises a stack of ferroelectric ceramic disks interleaved with a plurality of spaced electrodes which are used to electrically pole the ceramic disks. The ceramic stack is housed in a metal tubular drill collar segment. The electrodes are alternately connected to ground potential and driving potential. This alternating connection of electrodes to ground and driving potential subjects each disk to an equal electric field; and the direction of the field alternates to match the alternating direction of polarization of the ceramic disks.

Preferably, a thin metal foil is sandwiched between electrodes to facilitate the electrical connection. Alternatively, a thicker metal spacer plate is selectively used in place of the metal foil in order to promote thermal cooling of the ceramic stack. In still another embodiment of this invention, the thick metal spacer plates are comprised of a material (such as copper alloys, aluminum alloys or the like) which is softer than the relatively hard, brittle ceramic disks thus reducing the stresses upon the disks when the assembly is subjected to bending, torsion and the like; and thereby minimizing the risk of structural failure of the disks when in operation within a downhole acoustic signal generator.

Preferably, the ceramic disk assembly has a preload (or net compression) applied thereto. This preload is provided by loading the ceramic stack within an annular space defined by a pair of concentric, appropriately dimensioned (steel) tubes and having annular cylinders (preferably brass) abutting each end of the ceramic stack.

The transducer of the present invention may be used both for acoustic transmission and as an acoustic receiver. In the latter embodiment, only two ceramic disks are needed.

The transducer may be used in direct transmission of data signals through the drillstring or alternatively, may be positioned a short distance from the bottom end of the drillstring. In this way, a short length of drill collar will resonate thereby increasing the signal strength into the drill collar assembly and providing a source of high amplitude energy waves.

Transmission of the acoustic data signals generated by the transducer of the present invention will be enhanced by employing a transition segment (i.e., a tapered section of drill collar) between the drill collar and the smaller diameter drill pipe.

The above-discussed and other features and advantages of the present invention will be appreciated and understood by those of ordinary skill in the art from the following detailed description and drawings.

BRIEF DESCRIPTION OF THE DRAWINGS

The accompanying drawings, which are incorporated in and from part of the specification, illustrate an embodiment of the present invention and, together with the description, serve to explain the principles of the invention.

DESCRIPTION OF THE PREFERRED EMBODIMENT

Figure 3:
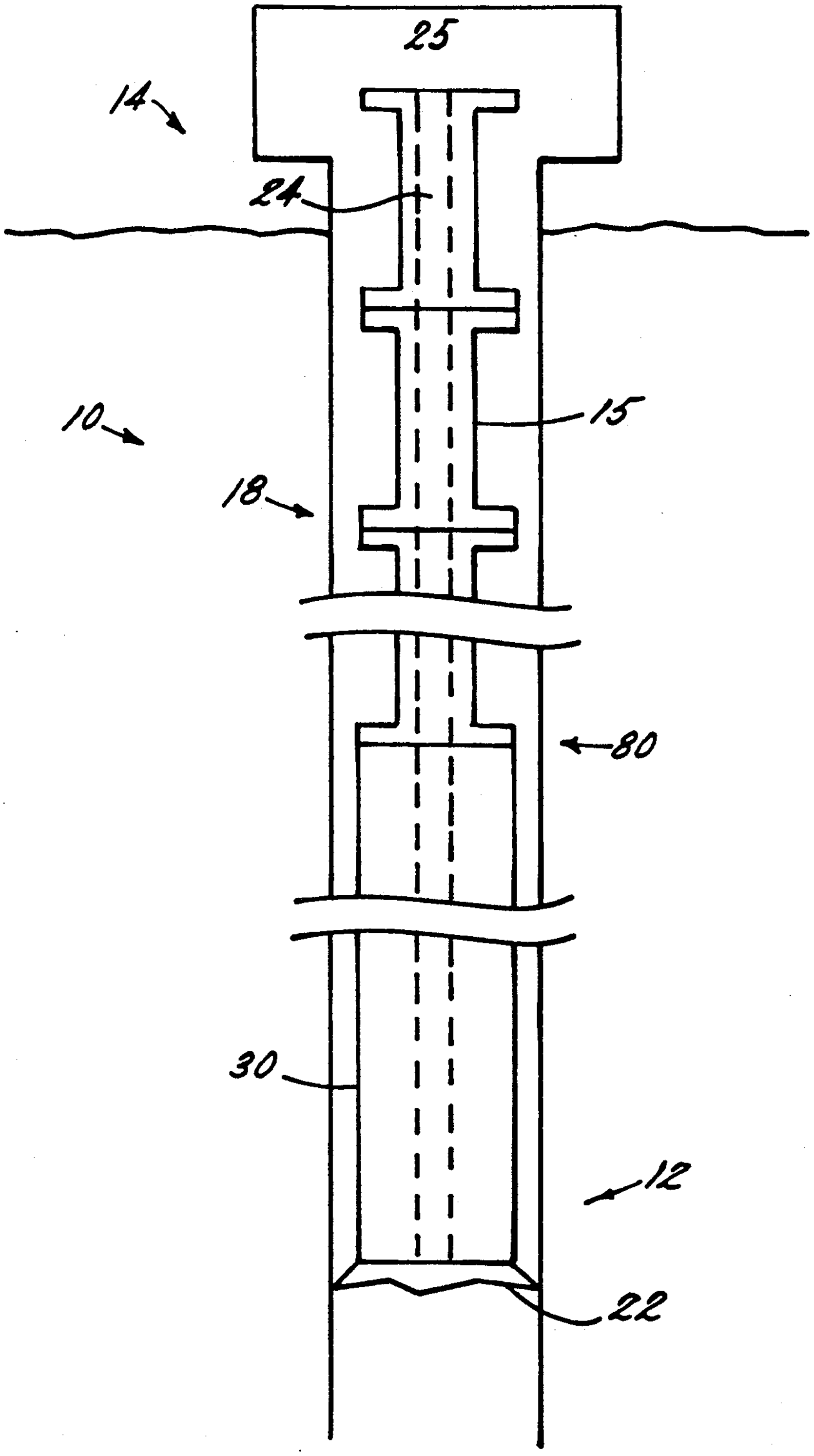
FIG. 3 shows a drillstring.

As shown in FIG. 3, this invention involves the transmission of acoustical data along a drillstring 10 which consists of a plurality of lengths of constant diameter drill pipe 15 fastened end-to-end at thicker diameter joint portions 18 by means of screw threads as well known in this art. Lower end 12 of drillstring 10 may include a length of constant diameter drill collar to provide downward force to drill bit 22. A constant diameter mud channel 24 extends axially through each component of drillstring 10 to provide a path for drilling mud to be pumped from the surface at upper end 14 through holes in drill bit 22 as is well known in this art. The upper end 14 of drillstring 10 is terminated in conventional structure such as a derrick, rotary pinion and Kelly, represented by box 25, to permit additional lengths of drill pipe to be added to the string, and the string to be rotated for drilling. Details of this conventional string structure may be found in the aforementioned patent of E. Hixon.

Although the disclosure is directed towards transmitting data from the lower end to the upper end, it is to be understood that the teachings of this invention apply to data transmission in either direction.

The theory upon which this invention is based begins with the derivation the following Equation 1, which equation is in the form of a classical wave equation:

$$\frac{\partial^2 F}{\partial t^2} = z^2 \frac{\partial^2 F}{\partial m^2} \tag{1}$$

where impedance $z=\rho ac$, and total axial force $F(m,t)=$ $$-cz\frac{\partial u}{\partial x}$$

where $\rho$ is density, a is area, and c is speed of sound in a slender, elastic rod, u is the displacement, m is the Lagrangian mass coordinate, and t is the time.

The existence of frequency bands which block propagation of acoustic energy is demonstrated for an idealized drillstring where each piece of drill pipe consists of a tube of length $d_1$, mass density $\rho_1$, cross-sectional area $a_1$, speed of sound $c_1$, and mass $r_1$; and a tool joint of length $d_2$, mass density $\rho_2$, cross-sectional area $a_2$, speed of sound $c_2$, and mass $r_2$. A procedure demonstrated at page 180 of Brillouin has been used with the Floquet theorem to generate the following eigenvalue problem:

$$\begin{pmatrix} z_1 & z_1 & z_2 & z_2 \\ 1 & -1 & 1 & -1 \\ z_1 e^{\alpha_1 r_1} & z_1 e^{\beta_1 r_1} & z_2 e^{-\alpha_2 r_2} & z_2 e^{-\beta_2 r_2} \\ e^{\alpha_1 r_1} & -e^{\beta_1 r_1} & e^{-\alpha_2 r_2} & -e^{-\beta_2 r_2} \end{pmatrix} \begin{pmatrix} A_l/z_1 \\ B_l/z_1 \\ -A_{l-1}/z_2 \\ -B_{l-1}/z_2 \end{pmatrix} = \begin{pmatrix} 0 \\ 0 \\ 0 \\ 0 \end{pmatrix} \tag{2}$$

where $$z_\xi = \rho_\xi a_\xi c_\xi \tag{3}$$

$$\alpha_\xi = i(kd/r - K_\xi) \tag{4}$$

$$\beta_\xi = i(kd/r + K_\xi) \tag{5}$$

Here k is the wave number, $i=\sqrt{-1}$, $r=r_1+r_2$, $d=d_1+d_2$, $\omega=2\pi f$, $K_\xi=\omega/z_\xi$, and f is the frequency being transmitted.

Brillouin shows that frequencies which yield real solutions for k are banded and separated by frequency bands which yield complex solutions for k. He calls these two types of regions passbands and stopbands. The attenuation in the stopbands is generally quite large. Within each of the passbands the value of the phase velocity $\omega/k$ depends upon the value of $\omega$. The drillstring functions as an acoustic comb filter, and frequencies which propagate in the passbands are dispersed. Thus, signals which have broad frequency spectra are severely distorted by passage through a drillstring. However, signal processing techniques can be used to remove this distortion.

It is to be understood that the "comb filter" referenced above refers to the gross structure in the frequency spectrum which is produced by the stopbands and the passbands, where each tooth of the comb is an individual passband. In contrast, Sharp's reference to a comb refers to a fine structure which exists within each passband.

Figure 4:
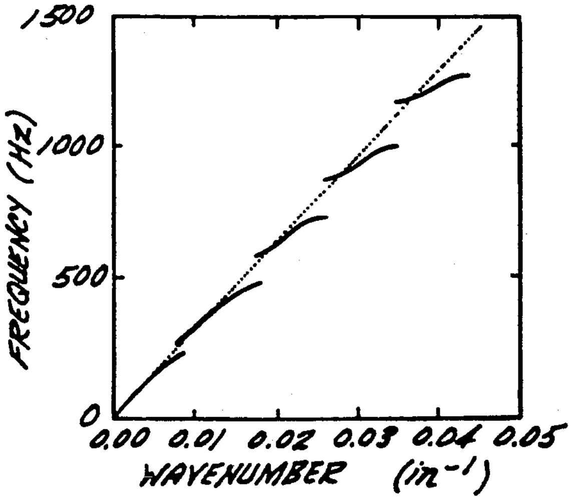
FIG. 4 shows dispersion curves for a uniform string (dashed line) and a typical drillstring (solid line)

FIG. 4 shows a plot of the characteristic determinate of Equation 2 using specific values for $\rho_\xi$, $a_\xi$, $c_\xi$, and $d_\xi$ representative of actual drill pipe parameters. The straight dotted line represents the solution for a uniform drillstring, e.g., one where the diameter of the joints is equal to the diameter of the pipe. The velocity of propagation for a given frequency is represented by the phase velocity, $\omega/k$. For the uniform drillstring, this ratio is constant and equal to the bar velocity of steel. When waves containing multiple frequency components travel through a uniform drillstring (or drill collar 20), they do not distort as all frequency components remain in the same relative position.

A different result occurs when the plot of FIG. 4 is curved, as each frequency then travels at a different speed. The solid lines of FIG. 4 represent the solution to Equation 2 for a realistic drillstring where the areas of the drill pipe is 2450 $mm^2$ (4 $in^2$) and the area of a tool joint is 12,900 $mm^2$ (20 $in^2$). In this situation, the phase velocity within each passband is not constant, meaning that distortion exists.

Furthermore, the gaps represent stopbands. This analysis predicts the same values for the boundaries between the stopbands and the passbands as that of Barnes et al; however, it also shows the characteristics of wave propagation within each of the passbands. Barnes et al did not predict the distortion resulting from the effects of the passbands.

Calculations using a smaller diameter tool joint, representative of the reduction in diameter that occurs from wear, shows the stopbands to be narrower. This change is to be expected, because the worn joints bring the string geometry closer to the uniform geometry that produced the straight, dotted line of FIG. 4.

Further calculations show that strings comprised of random length pipes will have significantly narrowed passbands, which upon further analysis, turn out to be "holes" created within the passbands. This result corresponds with, and for the first time explains, observations made by others.

Figure 2:
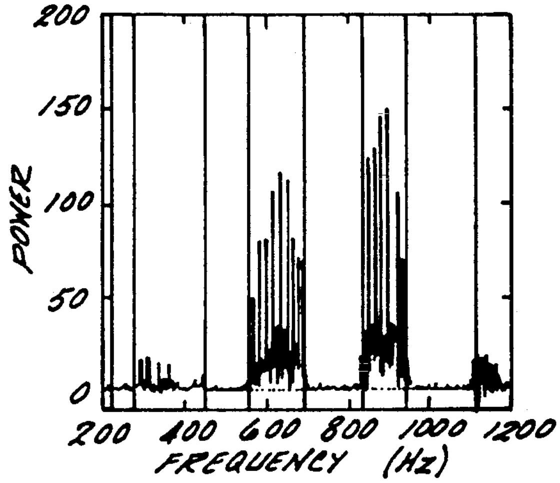
FIG. 2 shows the calculated frequency response within two passbands of the Cox and Chaney drillstring.

Since the transmission of acoustical data through the drillstring involves sending waves with complex transient shapes through strings of finite length, transient wave analysis has been used to predict the performance of the drillstring. FIG. 2 shows the third and fourth Passbands of a fast Fourier transform of the waveform which result from a signal which represents, to a rough approximation, the hammer blow used in the Cox and Chaney field test. This signal has a relatively narrow frequency content which only stimulates the third and fourth passband of the drillstring. Ten sections of drill pipe were used in this field test, and the ends of the drillstring produced nearly perfect reflection of the acoustic waves which resulted from the hammer blows.

This FIGURE shows the "fine structure" of Sharp et al to be caused by standing wave resonances within the drillstring. The number of spikes in each passband correlates with the number of sections of pipe in the drillstring, as explained in greater detail in the Appendix.

The analysis of this invention suggests the following technique for processing data signals and compensating for the effects of the stopbands and dispersion (e.g., the distortion discussed above). First, transmit information continuously (as opposed to a broad-band pulse mode) and only within the passbands and away from the edges of the stopbands. Second, compensate (i.e., precondition) for dispersion by multiplying each frequency component by exp(-ikL), where L is the transmission length in the drill pipe section 18 of the drillstring. Where a large amount of acoustical noise is present, such as would be caused by a drill bit or drill mud, it is preferable to transform the data signal before transmission, resulting in an undispersed signal at the receiver position. That is, the compensation discussed above of multiplying each frequency component by exp(-ikL) is preferably effected at a downhole location before transmission. However, the compensation could also be effected at the surface after receipt of the transmission.

The foregoing analysis is based on the assumption that echoes are suppressed at each end of the drillstring. This is necessary to eliminate the spikes or fine structure within each of the passbands. It is common knowledge that signal processing is effective when echo strength is 20 dB below the signal level. That is, echoes are not a problem if echo strength is at least 20 dB below signal strength. Each time the acoustic wave interacts with the intersection of the drill pipe and the drill collar 80, the signal weakens by 6 dB. Also, from the analysis of Cox and Chaney's field test, the signal attenuates about 2 dB/1000 feet. Therefore, an echo which is generated by a reflection of the data signal at the top of the drillstring 14 will lose 6+4 L dB as it travels back down the drillstring to 80 and then returns to the receiver (where L is in 1000's of feet). Thus, if the drill pipe section has a length of 3500 feet or more, the echoes from the receiving end of the string will be naturally attenuated to an acceptable level.

For shorter drillstrings, additional echo suppression will be required. This can be accomplished with a device called a terminating transducer. This device has an acoustical impedance which matches the acoustical impedance of the drillstring and an acoustical loss factor which is sufficient to make up the required 20 dB of echo suppression.

The acoustic impedance of the drillstring is the force F divided by velocity $$\frac{\partial u}{\partial t}.$$

This value is the eigenvalue part of Equation 2, a complex number with a real part called the viscous component and an imaginary part called the elastic component. Ideally, the terminating transducers must have a stiffness equal to the elastic component and a damping coefficient equal to the viscous component. Practically, the response of the terminating transducer need only make up the difference between 20 dB and the natural attenuation of the drillstring.

The acoustic impedance is a function of frequency and position, the position dependence being periodic in accordance with the period of the drillstring. Calculations show that tool joints are not a good location for a termination because the impedance is a sensitive function of position. Preferably, the terminating transducer should be located somewhere between the ends of a drillstring segment rather than at a joint. Solution of the eigenvalue problem (Equation 2) can be used to determine the acoustic impedance and to determine preferred locations for the terminating transducer. For example, for the fourth passband, a location $\frac{1}{3}$ or $\frac{2}{3}$ along the pipe was determined to be desirable.

The design of termination transducers may be accomplished by those of ordinary skill in that art when provided with the impedance data from Equation 2. This device, for example, could consist of a ring of polarized PZT ceramic element and an electronic circuit whose reactive and resistive components are adjusted to tune the transducer to the characteristic impedance of the drillstring and provide the necessary acoustic loss factor.

Echo suppression is a more critical problem at the downhole end of the drillstring where echoes travel freely up and down the drill collar section and confuse the transmission data. At this location, it is useful to use noise cancellation techniques both to suppress echoes and to prevent the noise of the drill bit or drilling mud from interfering with the desired data signal uphole. A noise cancellation technique for use with this invention is disclosed hereinafter.

Figure 5:
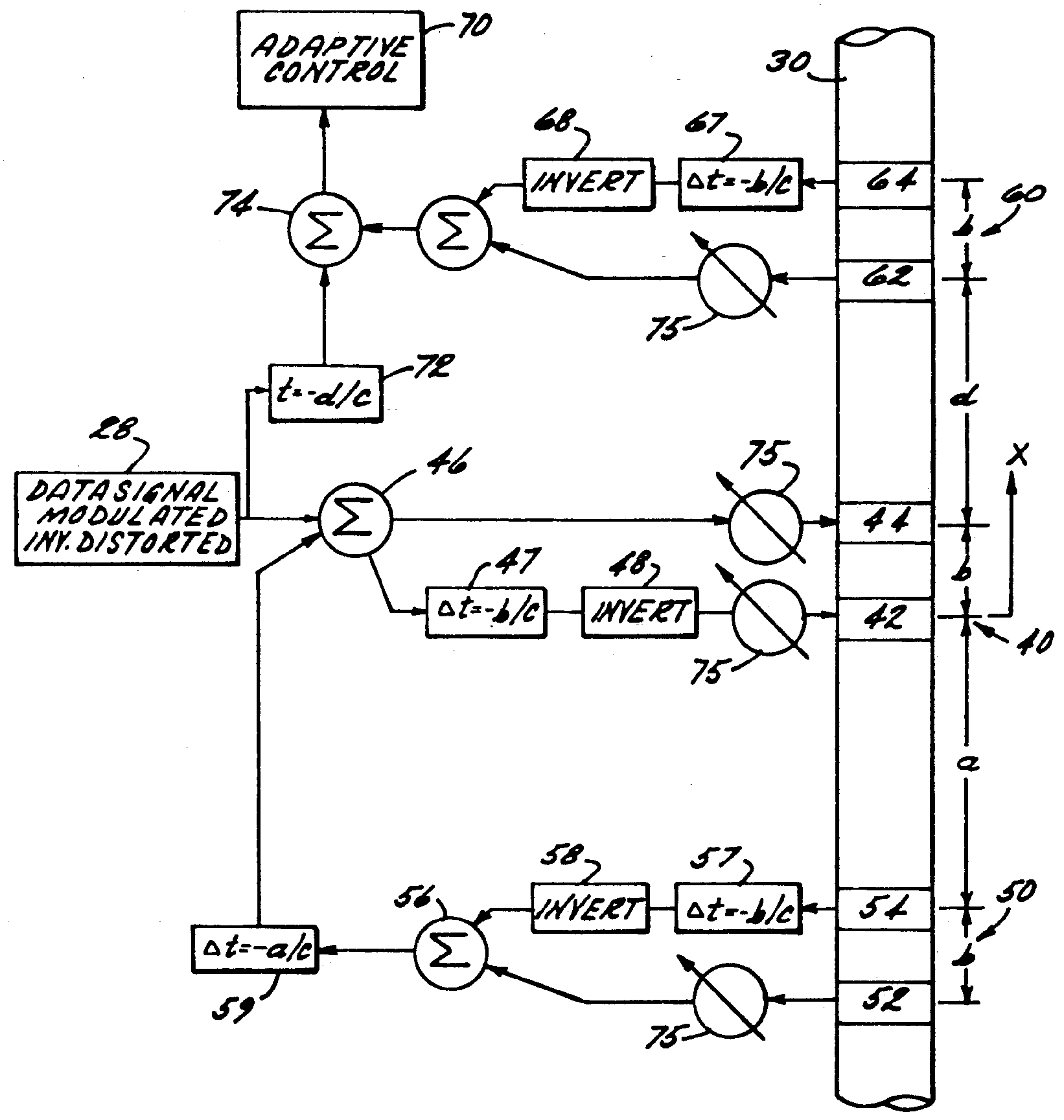
FIG. 5 shows the transmission arrangement at a first end of a drillstring.

FIG. 5 shows a section 30 of drill collar 20 located relatively close to downhole end 12 of drillstring 10 and containing apparatus for transmitting a data signal toward the other end of the drillstring while suppressing the transmission of acoustical noise up the drillstring. In particular, this apparatus includes a transmitter array 40 for transmitting data uphole, but not downhole, a sensor array 50 for detecting acoustical noise from downhole and applying it to transmitter array 40 to cancel the uphole transmission of the noise, and a sensor array 60 for providing adaptive control to transmitter array 40 and sensor array 50 to minimize uphole transmission of noise.

Transmitter array 40 includes a pair of spaced transducers 42, 44 for converting an electrical input signal into acoustical energy in drill collar 30. Each transducer may be a magnetostrictive ring element with a winding of insulated conducting wire or a ring of PZT ceramic elements embedded in a cavity in the drill collar (as discussed in detail hereinafter with respect to FIGS. 7-9). These transducers are spaced apart a distance b equal to one quarter wavelength of the center frequency of the passband selected for transmission. A data signal from source 28 is applied directly to uphole transducer 44, preferably through a summing circuit 46. Preferably, the data signal is a continuous signal (such as an FM signal or PSK (phase shifted key)) data modulated in accordance with the data to be transmitted. Note that the data signal has been compensated for distortion by being multiplied by exp(-ikL), as discussed previously, and as indicated by the inverse distortion designation in signal source 28. The data signal is also applied to transducer 42 through a delay circuit 47 and an inverting circuit 48. Delay circuit 47 has a delay value equal to distance b divided by the speed of sound in drill collar 30 at transmitter 40.

The operation of this transmitter may be understood from the following explanation. Each of transducers 42, 44 provide an acoustical signal $F_2$, $F_4$ that travels both uphole and downhole. Accordingly, the resulting upward and downward waves from both transducers are:

$$\phi_u(t,x) = F_2(t - x/c) + F_4(t - (x - b)/c)) \text{ where } x > b \quad (6)$$

$$\phi_d(t,x) = F_2(t + x/c) + F_4(t + (x - b)/c)) \text{ where } x < 0$$

where x is the uphole distance from transducer 42 and c is the speed of sound. For no downward wave, $\phi_d(t,x)=0$, or $$F_2(t) = -F_4(t-b/c) \quad (7)$$

and $$\phi_u(t,x) = -F_2(t-(x+b)/c) + F_2(t-(x-b)/c) \quad (8)$$

If the acoustical signal $F_2$ has the form Acos(t), then Equation 8 solves to $$\phi_u(\tau) = -2A\sin(\omega b/c)\sin(\omega t) \quad (9)$$

where $\tau=(t-x/c)$.

Accordingly, with a quarter wavelength spacing for waves at the center of the transmission passband, transmitter 40 transmits an uphole signal have approximately twice the amplitude A of the applied signal, and no downhole signal.

Noise sensor 50 includes a pair of spaced sensors 52, 54 which operate in a similar manner to provide an indication of acoustic energy moving uphole, and no indication of energy moving downhole. The output of sensor 52, which sensor may be an accelerometer or strain gauge, is an electrical signal that is summed in summing circuit 56 with the output of similar sensor 54, which output is delayed by delay circuit 57 and inverted by inverting circuit 58. If the delay of circuit 57 is equal to the spacing b divided by the speed of sound c, downward moving energy is first detected by sensor 54 and delayed, and later detected by downhole sensor 52. The inverted electrical signal from 54 arrives at summing circuit 56 at the same time as the output of sensor 52, providing a net output of zero for downward moving noise. Upward moving noise of the form $A\sin\omega(t-x/c)$ yields an output from summing circuit 56 of:

$$\phi(t) = 2A\sin(\pi f/2f_0)\cos\omega(t-b/c) \quad (10)$$

where f is frequency and $f_0$ is the center frequency of the passband.

In the description which follows it is to be understood that all electrical signals are filtered so that the frequency content is limited to the passband or bands which are used for data transmission. Sensor 50 is spaced from transmitter 40 by distance a. Accordingly, noise that is sensed at sensor 50 arrives at transmitter 40 a time a/c later (assuming perfect transducers). If the output of sensors 50 is delayed by delay circuit 59 for an interval of a/c and applied to transmitter 40 through summing circuit 46, the output of transmitter 40 can be shown to cancel the upward moving noise to within an error $\epsilon=-(\sin(\omega b/c))^2+1$. For a bandwidth-to-center frequency ratio of 150 Hz/650 Hz, the error is zero at the center of the transmission band and is only 0.03 at the band edges, a result showing 30 dB noise cancellation.

Further control of upward moving noise is provided by adaptive control 70, a conventional control circuit that has an input from a second pair of sensors 62, 64. These sensors, identical to sensors 52, 54 also have corresponding delay circuit 67 and inverter 68 to provide an output indicative of an upward moving wave and no output in response to a downward moving wave. The upward moving wave at control sensors 60 is a mixture of the noise and data that passed transmitter 40. Accordingly, by delaying the data signal in delay circuit 72 and adding the result to the output of sensors 60 with summing circuit 74, an error signal is produced which indicates the effectiveness of noise cancellation. This signal is fed into an adaptive control circuit 70, such as a control circuit based on a least mean square (LMS) microchip, which controls conventional circuitry 75 to adjust voltage amplitudes or phases of the signals being applied to any of sensors 52 and 62 or transmitters 42, 44 to minimize the amount of noise being transmitted upward towards the surface.

For a conventional steel drill collar, the spacing b between sensors or transmitters in the third passband would be about 30 cm (78 inches) or about 21 cm (53 inches) in the fourth passband.

The operation of the invention is as follows: The circuitry of FIG. 5 is mounted on a drill collar, including suitable circuitry 28 for generating data representative of a downhole parameter. Power supplies, such as batteries or mud-driven electrical generators, and other supportive circuitry known to those or ordinary skill in the art, would also be incorporated into drill collar 30. The drill bit and mud create acoustic noise that travels in both directions through drill string 10. Downward noise is not sensed by the sensors; however, upward noise, including echoes from the bottom of the drill collar, are sensed by sensor circuit 50 and applied to transmitter circuit 40, yielding a greatly reduced upward component. Primarily the data travels to the connection 80 (FIG. 3) between drill collar 30 and the lowest drill joint 18, where a significant reflection of the data occurs because of the mismatch in acoustic impedance between these elements. Further echoes occur at the tool joints 18 between each section of drill pipe 15. These echoes move downward through drill collar 30 where they pass the circuitry of FIG. 5 undetected, and become noise that is cancelled out when they echo off the bottom of the drill collar. The signal that reaches the top is detected by a receiver 82. The receiver 82 may be any conventional receiver capable of detecting and transducing acoustic signals, such, e.g., strain gages, accellerometers, PZT ceramic elements, etc. arranged to sense axial motion only. A preferred embodiment of a receiver is described hereinafter with respect to FIG. 13.

If, as discussed above, an impedance matched transducer, such as PZT ceramic elements is used to terminate the signal to suppress echoes, that transducer may also be used as the receiver 82 to provide an accurate representation of the data transmitted from below.

As stated above, the data from circuit 28 may be precompensated by multiplying each frequency component of the signal by exp(-ikL) to adjust for the distortion caused by the passbands of the drillstring. Such compensation may be accomplished by any manner known to those of ordinary skill in the art with a device such as an analog-to-digital signal processing circuit.

As is known in the art, the location of the receiving transducer is important to facilitate and optimize detection of the transmitted signal. If there is an acoustic termination structure in the system, (i.e., an acoustic infinite boundary condition), whether the specific terminating structure discussed above for echo suppression at the top of the drillstring, or a natural terminating element in the drillstring structure, then the location of the transducer may be selected at random, and the type of transducer (i.e., strain gage or accelerometer) does not matter. However, if that infinite boundary condition does not exist, then location of the transducer must be based on the transmission band of the data signals, the type of transducer and the type of the acoustic boundary condition (i.e., whether free surface, partially absorbative free surface, rigid surface, partially absorbative rigid surface, etc.). on a first order basis, for a given type of transducer, e.g., strain gage type, the location will be determined by the center of the transmission band frequency and the boundary condition. However, generally speaking, the optimum position for a strain gage type transducer would be undesirable for the location of an accelerometer type transducer, which should be located one-quarter wavelength away. As is also standard in the art, the data received at receiver 82 is transmitted to surface processing equipment to be processed, recorded and/or displayed.

This invention recognizes and resolves the problems noted by many previous workers in the field of transmitting data along a drill string. As a result, quality transmission on continuous acoustic carrier waves without extensive downhole circuitry, and without the use of impractical repeater circuits and transducers along the drill string, is possible at frequencies on the order of several hundred to several thousand Hertz. These frequencies are high in relation to the ambient drilling noise (about 1 to 10 Hz), and therefore allow transmission relatively free of this noise. Also the bandwidths of the passbands allow data rates far in excess of present mud pulse systems. Also it is recognized that this method will work in drilling situations where air is used instead of mud.

As shown in FIG. 5, each sensor 40, 50 and 60 comprises a pair of spaced transducers 42, 44, 52, 54 and 62, 64. Also as shown in FIG. 5, each sensor (or transducer pair) is associated with an electronic circuit for digitally processing the analog electrical signals transmitted and/or received by the transducer pairs. In the electronic circuit associated with sensor 50, this circuit includes time delay circuitry 57 for delaying the voltage signal from transducer 54, inverting circuitry 58 for inverting the delayed voltage signal, summing circuitry 56 for combining the inverted voltage signal with a voltage signal from transducer 52, and compensating circuitry 75 for compensating for differences in sensitivity between voltage signals produced by transducers 54 and 52.

The electronic circuit described above with respect to sensor 50 is also used in conjunction with sensor 60 (see items 67, 68, 66 and 75) and to drive sensor 40 (see items 46, 47, 48 and 75).

Figure 6:
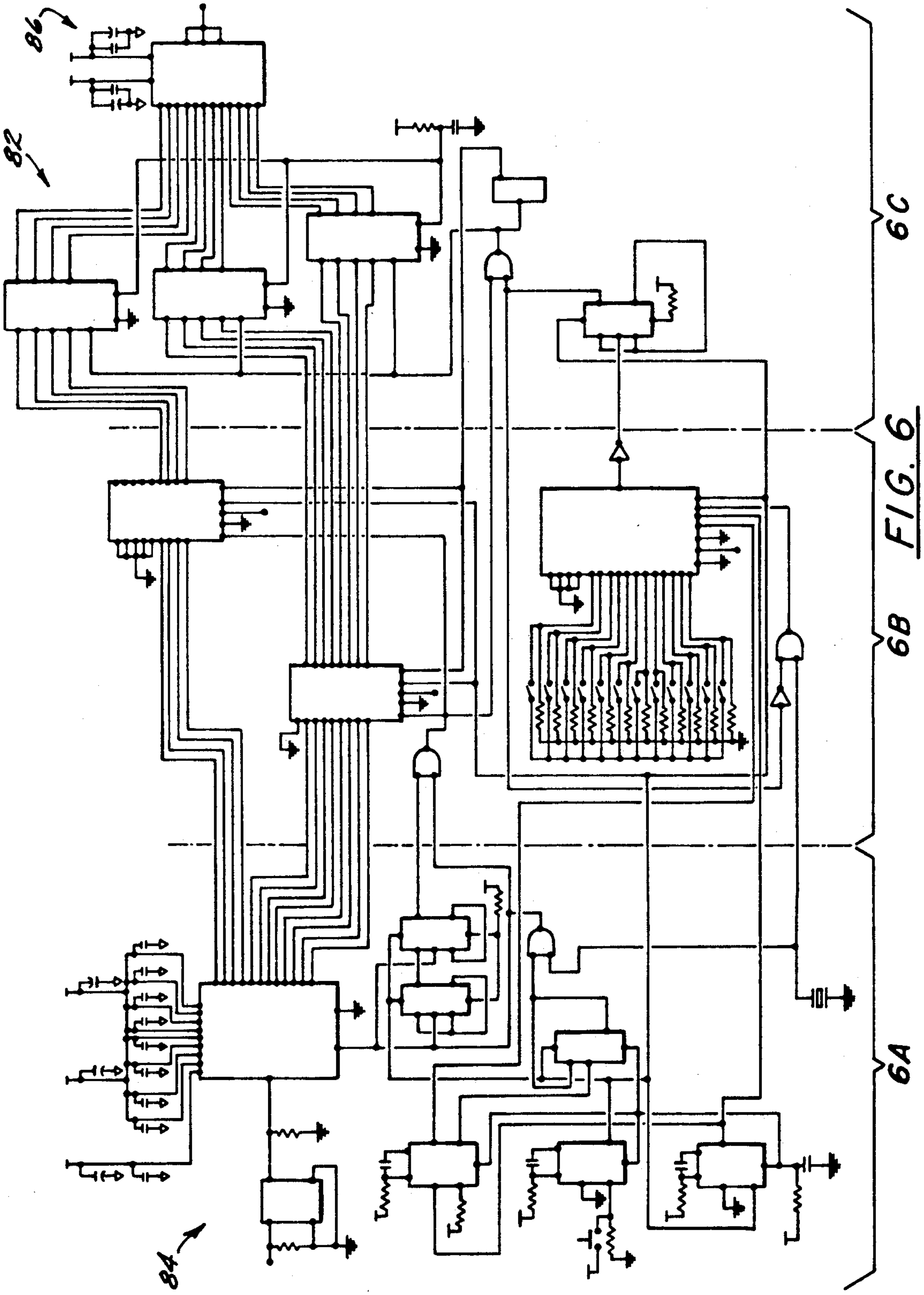
FIGS. 6 and 6A-6E are electrical schematic diagrams of digital time delay circuits in accordance with the present invention.
Figure 6A:
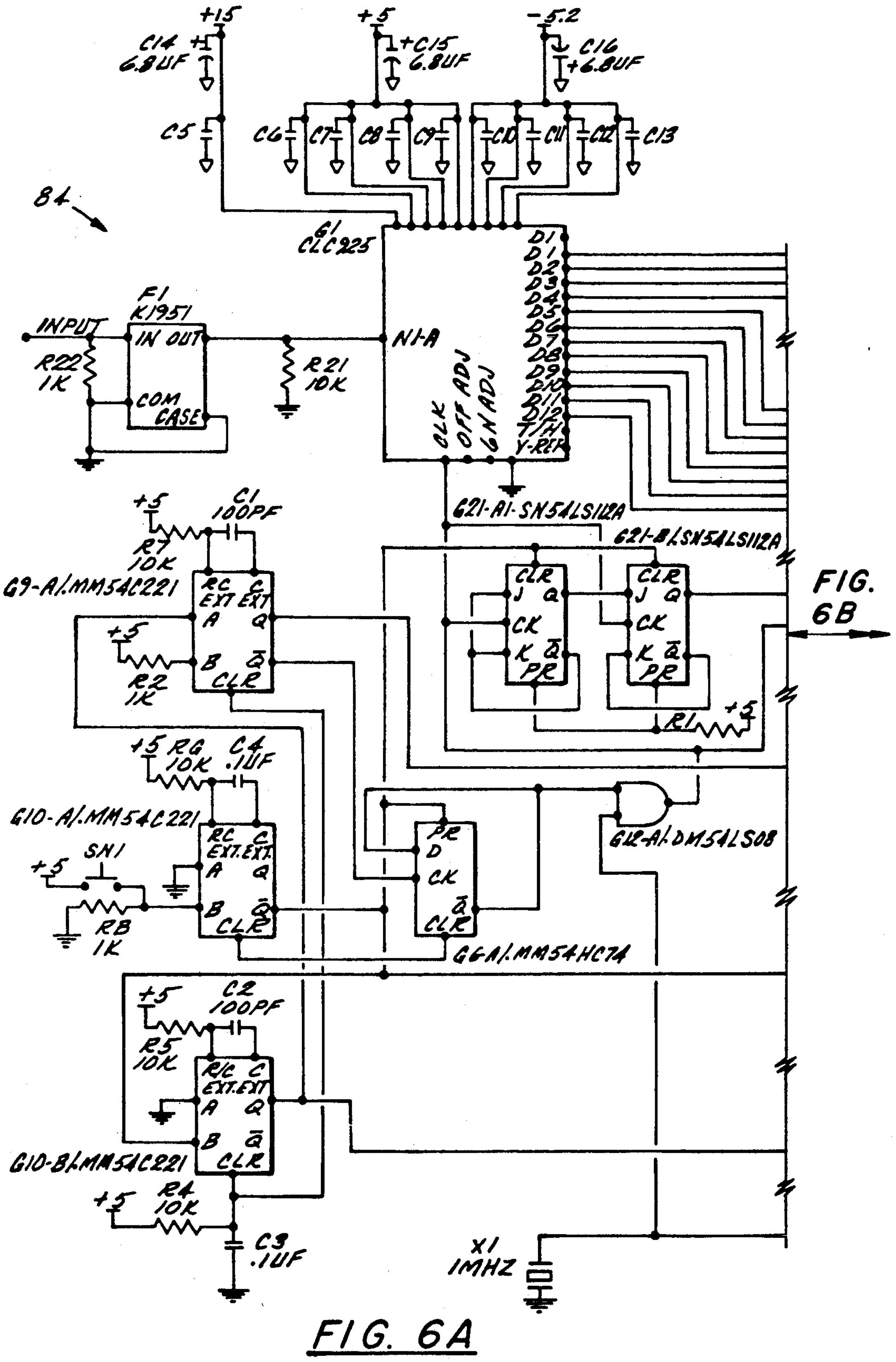
Figure 6B:
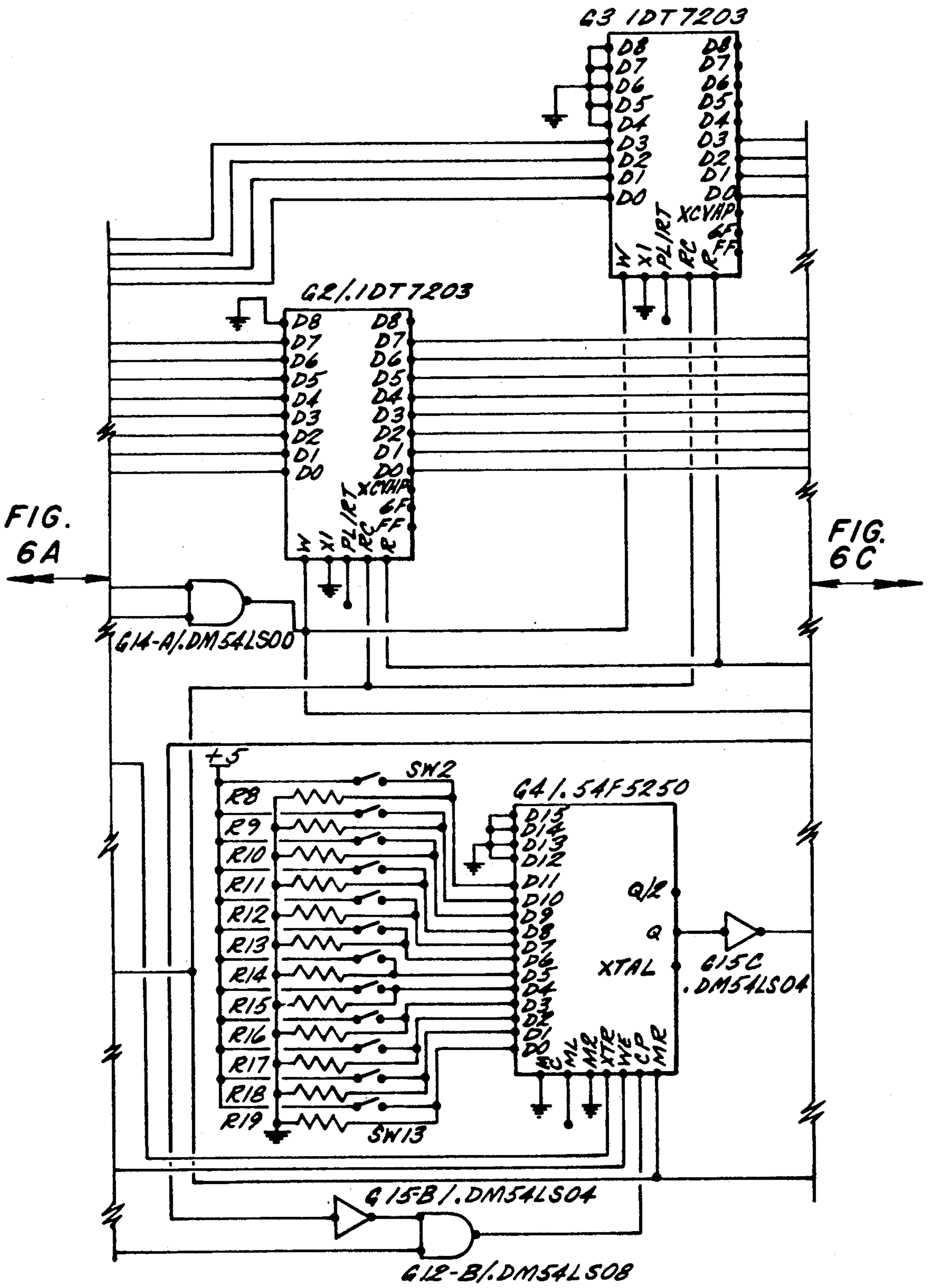
Figure 6C:
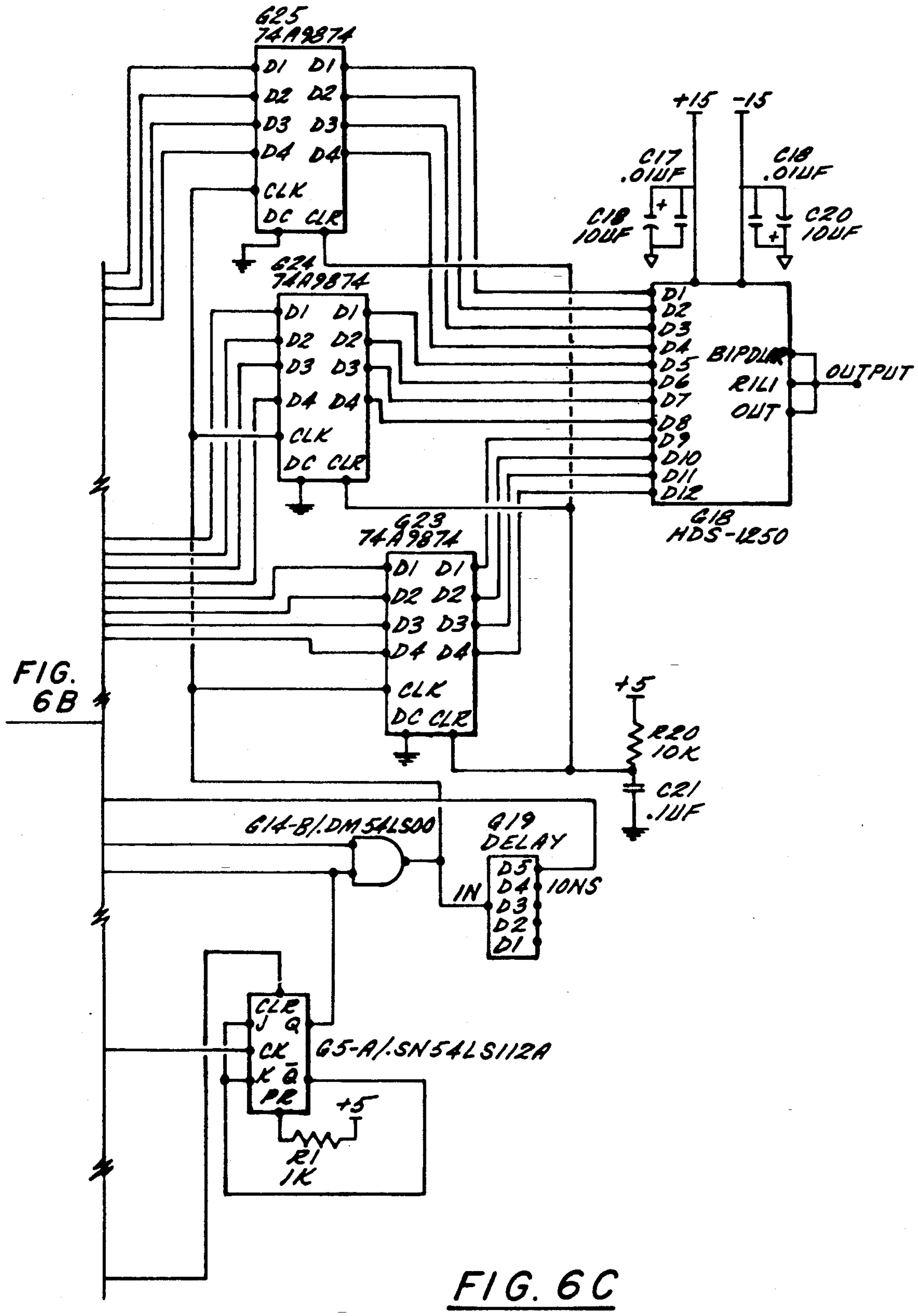
Figure 6D:
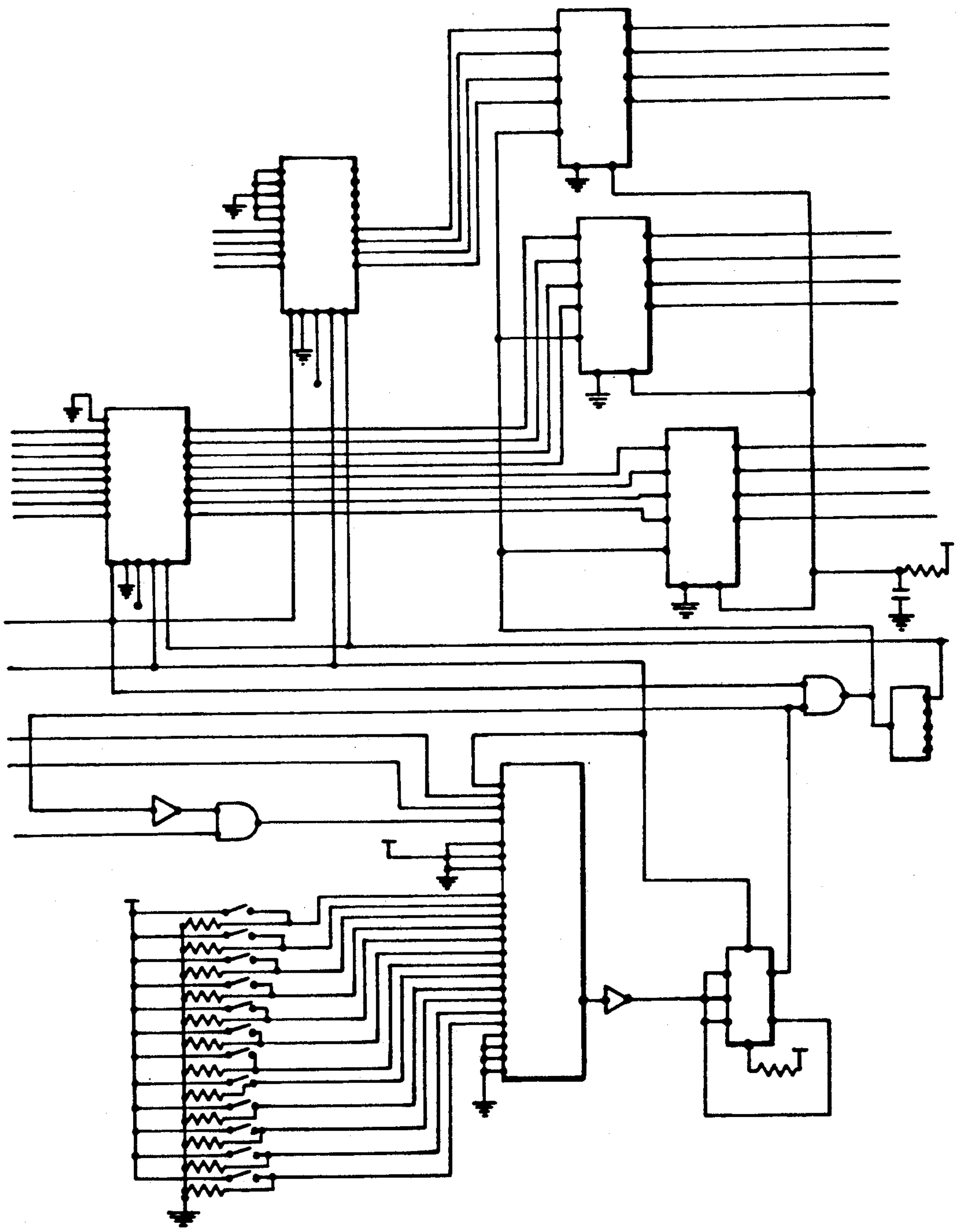
Figure 6E:
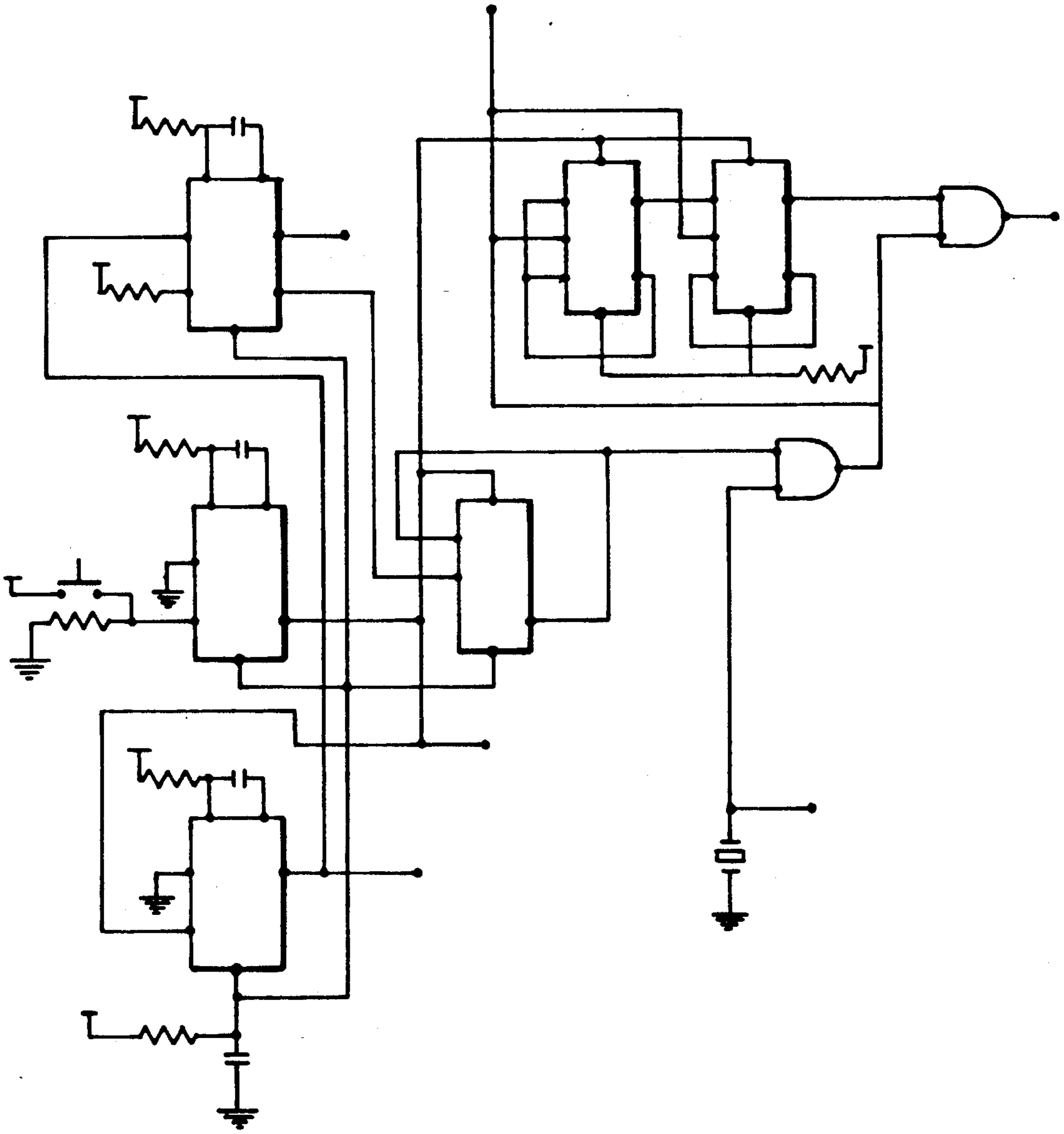

A preferred embodiment of the time delay electronic circuitry described immediately above which will sense, delay and recombine the various analog electrical signals from sensors 40, 50 and 60 is shown generally at 82 in FIG. 6. FIGS. 6A, 6B and 6C are enlarged views of the sections in FIG. 6 identified by the letters A, B, and C, respectively. The enlarged FIGS. 6A–C include circuit component identification indicia. The portion of circuit 82 which is adapted primarily for time delay is shown in FIG. 6D; while the portion of circuit 82 adapted for the reset function is shown in FIG. 6E. Of course, circuit component identification for the schematics of FIGS. 6D–E may be found with reference to FIGS. 6A–C. Note that C5 through C13 have values of 0.1 $\mu$F. Also, R8 through R19 have values of 1.1K.

In FIG. 6, a digital circuit is depicted which has both an analog-to-digital (A/D) converter G1 at the input (identified at 84) and a digital-to-analog converter G18 at the output (identified at 86). It will be appreciated that when the circuit of FIG. 6 is used in conjunction with either sensor 50 or 60, the D/A converter G18 is not required. Conversely, when circuit 82 is used in conjunction with sensor 40, the A/D converter G1 is not required.

Circuit 82 is configured to process signals with a frequency content of approximately 1000 Hz. Its sampling rate is 1 $\mu$s. This is faster than necessary to resolve a 1000 Hz signal; however, this rate is required to obtain the necessary resolution in the time delay ($\Delta t$). This time delay is achieved by an up-counter microchip in conjunction with First-in-First-out (FiFo) microchips G2–G3. The signals from 52 and 62 must be delayed by 250 $\mu$s for a 1000 Hz frequency. The counter allows from 1 to 2048 $\mu$s delay. The delay is selectable in steps of 1 $\mu$s. This selectability allows fine tuning of the circuit at the six critical time delay points 57, 59, 47, 67, and 72 to achieve maximum performance.

A description will now be made of the remaining components of circuit 82 and the operation thereof. Microchips G9-A, G10-A, G10-B, G6-A, G21-A and G21-B are state initializers to reset the FiFo memories; load the binary delay time selected by the switch array SW2-SW13 into the counter; start the counter; begin the A/D conversion; and initiate loading of digital data into the FiFo memory at the third clock pulse (the internal delay of this A/D converter). After the circuit is initialized, analog data entering the input to the A/D converter, G1, is converted into digital data and stored in the FiFo memories, G2 and G3. The data is held in memory until the counter, G4, reaches the number of clock pulses determined by the switch-array settings. At this point the counter outputs a pulse that toggles the flip-flop, G5-A, and enables the NAND gate, G14-B. The read enable input of the FiFo memory is now clocked and the digital data is input to the D flip-flops, G23-G25, where it is held for a full clock cycle on the output of the flip-flops. The delay circuit, G19, is used to synchronize the read-enable pulse for the FiFo's when the clock pulse of the D flip-flops. This is required to meet the data hold time and data setup time requirements of the flip-flops. At this point the data is in a highly stable digital state and is available for any number of operations as required by the driving and receiving transducers. These can include, but are not limited to, addition, subtraction, and frequency filtering. In the circuit shown, the information is converted back to it's analog form by the D/A converter, G18.

An important feature of circuit 82 is bandpass filter F1 position at the input 84 to A/D converter G1. Filter F1 has two primary purposes. First it isolates the circuit from drilling noise which is primarily located at low frequencies. Second, it eliminates the high-frequency content of the output of the circuit. The transducers 42 and 44 which are driven by the circuit are of a sub-resonant type. Their gain is proportional to frequency, and the presence of high-frequency in the circuit output will cause the array to become unstable. Thus the filters stabilize the system. The specifications for the filter will vary with the base frequency of the system.

Still another important feature of circuit 82 is that it operates with 12-bit processing resolution. This is greater than necessary for resolution of the data signal, but it is required because of the high-amplitude transient noise levels. The circuit 82 of FIG. 6 has been described in conjunction with an acoustic telemetry application having specific requirements for digitizing rates and delay times. It will be appreciated that circuit 82 can also be used in other applications. The clock rate can be operated as high as 10 MHz so that signals with much higher frequency content can be delayed. With the current switch array, the maximum delay is 2048 clock pulses; however, the counter will count up to 32,768 clock pulses, and the FiFo memories can be expanded to give delays that are equivalent to the counter time in clock pulses. An example of an alternate use of delay circuit 82 is in data acquisition. Suppose several channels of data occur simultaneously and only one storage channel is available. All but one of these data strings can be delayed until the first data channel is loaded into memory. Following this, the second data string can be loaded into memory. Thus a single memory channel with a sufficiently high acquisition rate can be used with several channels of this digital delay circuit and a multiplexer to sequentially load several strings of data into one memory channel.

Figure 1:
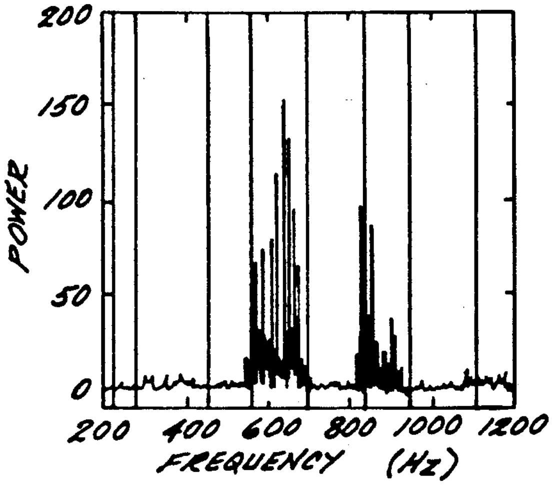
FIG. 1 shows the measured frequency response within two passbands of the Cox and Chaney drillstring.
Figure 8:
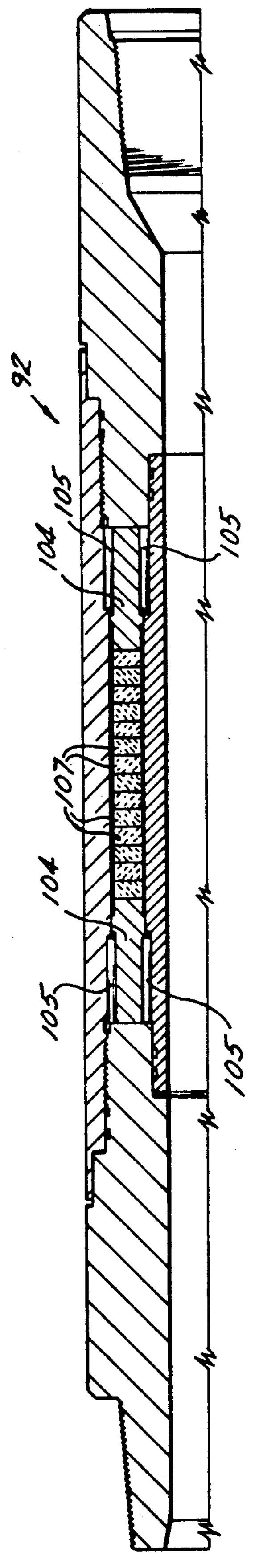
FIG. 8 is a cross-sectional elevation view, similar to FIG. 7, depicting additional components of the acoustic transducer of FIG. 7.
Figure 7:
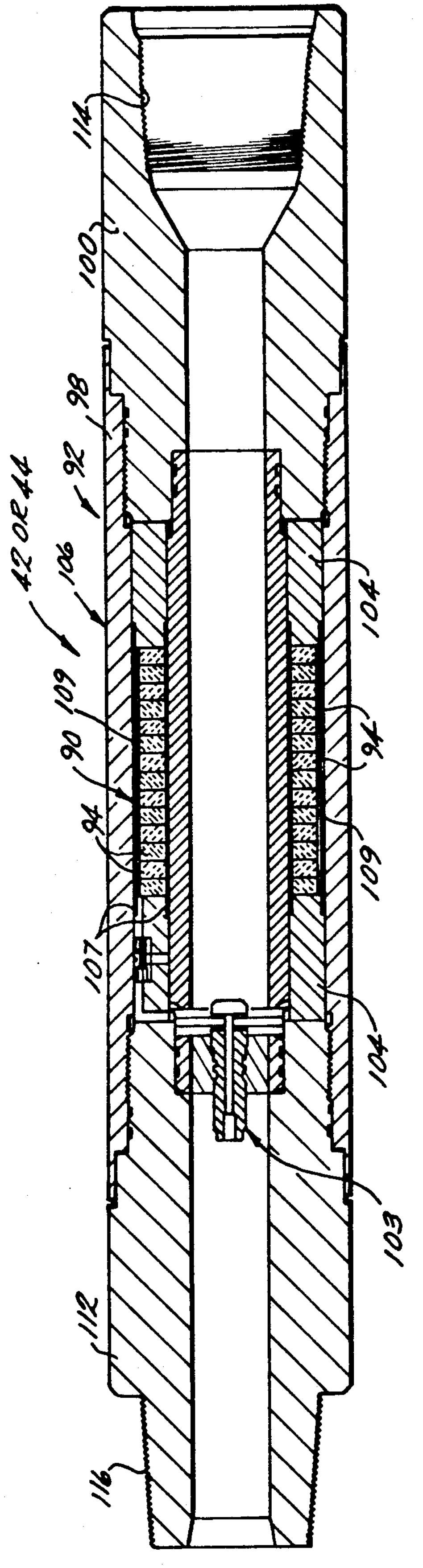
FIG. 7 is a cross-sectional elevation view through the length of a drill collar segment housing an acoustic transducer in accordance with the present invention.

Referring now to FIGS. 7 and 8, a transducer for performing the functions (e.g., converting an electric signal into an elastic wave which has an extensional motion along the axis of the drillstring) required for items 42 and 44 in FIG. 1 comprises a stack of elements identified at 90 and housed in a drill collar segment shown generally at 92. (It will be appreciated that two drill collar segments 92 comprise a single sensor array 40). Stack 90 comprises a plurality of annular disks 94 (i.e., rings) which are preferably identical in configuration and made from a suitable ferroelectric ceramic material such as lead zirconium titanate (PZT). While fourteen (14) disks 94 are shown in FIG. 2, it will be appreciated that any even number of disks may be utilized in conjunction with the present invention. Each disk 94 has a flattened upper and lower surface. An electrode 96 (see FIG. 10) is deposited on each surface so that a pair of electrodes 96 sandwich each ceramic disk 94. Electrodes 96 are used to electrically pole the ceramic material.

Figure 9:
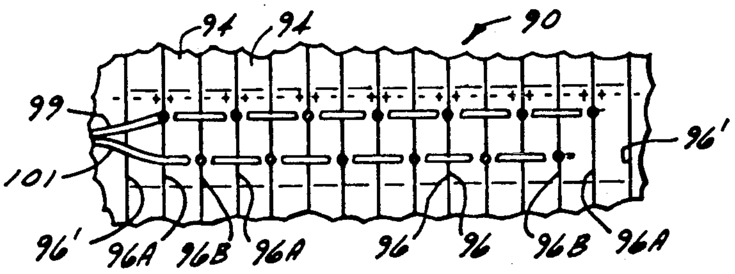
FIG. 9 is an enlarged plan view showing the electrical wiring configuration for the ceramic stack in the acoustic transducer of FIG. 7.

In one embodiment of the present invention shown in FIG. 9, disks 94 are stacked so that the poling direction alternates with respect to adjacent disks as indicated by the positive and negative signs. Thus, electrodes 96 on adjacent disks 94 which contact one another will be equi-polar (e.g., + + or − −). Electrodes 96' which are positioned at the extreme ends of stack 90 are electrically connected to ground potential (that is, the electrical potential of the steel drill collar 92). The electrical potential of the electrodes 96A which are located at one-disk thickness from the ends of stack 90 are connected to the driving potential (via an insulated conductor 99 as shown in FIG. 9). The electrodes 96B which are positioned at two-disk thicknesses from the ends of stack 90 are connected to ground potential (via an insulated conductor 101 as shown in FIG. 9). This alternating connecting scheme is repeated for each of the electrodes 96 so that each adjacent electrode alternates between ground and driving potential. In this way, each disk 94 is subjected to an equal electric field; and the direction of the electric field alternates to match the alternating direction of polarization of the ceramic disks. The several wire conductors 99, 101 are brought out from stack 90 to a suitable power supply via electrical connector 103.

Figure 10:
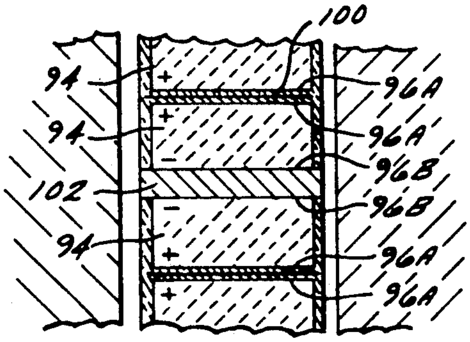
FIG. 10 is an enlarged view of a portion of the ceramic stack assembly of FIG. 7.

As best shown in FIG. 10, electrical connection between electrodes 96 and an adjacent disk 94 is facilitated by sandwiching either a layer of metal foil 100 or a metal plate 102 between each disk 94. The electrodes 96, foil 100 and plate 102 may all be bonded together using a suitable and known conducting epoxy or like conductive adhesive material. Alternatively, the adhesive may be dispensed with in favor of the interconnection between the ceramic disks being provided by pressure exerted on stack 90. Preferably, and as described above, every second electrode 96B in stack 90 is connected to electrical ground. At these ground potential locations, a thick metal plate 102 approximately ⅛ to ¼ inch is preferred over the thin foil layer 100 in order to facilitate thermal cooling to ceramic stack 90. It will be appreciated that under conditions of large and continuous application of electrical power, dielectric losses in the ceramic material are sufficient to cause severe heating of stack 90. If allowed to raise the temperature of the stack, this effect will eventually depole or otherwise damage the ceramic. The metal plates 102 at the ground electrodes 96B facilitate cooling of stack 90 by conducting heat away from the ceramic and into the surrounding drill collar 98. Since these electrodes are at the same electrical potential as the steel collar 98, good thermal conduction to said steel collar is easily achieved. The remaining positive electrodes 96A (at the driving potential) must be electrically insulated from steel casing 98. As a result, positive electrodes 96A do not serve as good cooling paths.

In another embodiment of the present invention, the sensitivity of stack 90 is increased by aligning all of the polarization directions and disconnecting each of the plates 102 from electrical ground. The electrodes 96 are then reconnected in a series configuration with neighboring foils 100. In other words, electrodes 96A are electrically connected to each other in series. One of the electrodes 96' at the end of stack 90 is then insulated from any surrounding conductive surface and is connected to a high impedance load. The voltage on this electrode is proportional to the axial strain.

Referring again to FIGS. 7–8, cylinders 104 are connected to each end of ceramic stack 90. Cylinders 70 are preferably comprised of brass. Ceramic stack 90 and brass cylinders 104 are encased in an annular steel jacket 106 (comprised of an inner tube 108 and a spaced outer tube 98) positioned between a pair of threaded end caps 110, 112. Brass cylinders 104 are keyed to adjacent jacket 106 using suitable dowel pin 105 (see FIG. 8). The dimensions of jacket 106 and cylinders 104 are chosen so as to provide a net compression (or prestress) on stack 90. The amount of net compression is controlled by adjusting the tolerances of jacket 106 and cylinders 104. The amount of compression is measured during assembly by monitoring the electrode potential of stack 90.

Stack 90 is placed within an electrically insulating shell 107 with the outermost surface of stack 90 and shell 107 being separated by a gap 109 filled with a suitable anti-arcing material (e.g., Fluoro-Inert by DuPont).

The length of the brass cylinders 104 is chosen so as to provide compensation for thermal expansion. Because brass has a greater coefficient of thermal expansion than that of steel, an appropriate length of brass will exactly compensate for the expansion of the steel case during heating or cooling of the entire assembly. Since the thermal coefficient of expansion of the ferroelectric disks are relatively small, the preload or net compression on stack 90 will not be effected by uniform heating of the assembly. This is an important consideration in petroleum and geothermal well environments. Opposed end caps 110, 112 are provided with conventional oil field box 78 and pin 80 threadings. The inside and outside diameter of the assembly 92 matches standard drill collar dimensions. Accordingly, drill collar segment 92 can therefore be screwed into a standard oil field drill collar assembly. It is important that the acoustic impedance of transducer 92 be closely matched to the acoustic impedance of the drill collar (shown at 30 in FIG. 5). Operation of the assembly 92 is at frequencies which are considerably below any resonance of the transducer assembly. This greatly facilitates assembly and operation of the transducer by reducing the mechanical fatigue problems at various bonds in the assembly. The gain of the transducer is approximately characterized as being linearly proportional to the driving frequency times the combined length of the ceramic disks 90.

Figure 11:
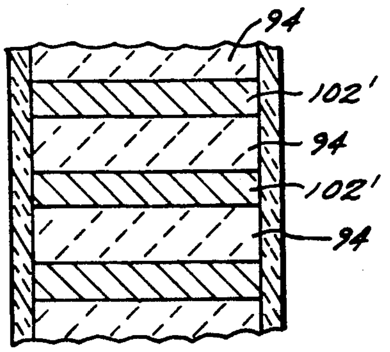
FIG. 11 is a sectional view, similar to FIG. 8, depicting an alternative embodiment of the ceramic stack assembly.

Turning now to FIG. 11, an alternative configuration for a transducer in accordance with the present invention is shown at 90'. In the FIG. 11 embodiment, spacer rings 102' serve two distinct functions. Firstly, and as described with regard to spacers 102, each plate 102' provides sufficient thermal expansion/contraction such that the stack of ceramic disks 94 (having a low coefficient of thermal expansion), and spacer material 102' (having a high coefficient of thermal expansion) is equivalent to the steel housing 106 encasing stack 90'. In addition, and in accordance with a second function, spacer material 102' comprises a material which is somewhat softer than the hard, brittle ceramic disks 94' and thus reduces the stresses upon disks 94 when the assembly is subjected to bending, torsion and the like; and thereby minimizes the risk of the disks structurally failing when in operation within a downhole signal generator. However, this softer spacer material may be less preferred as it may reduce the acoustic performance of the transducer. Examples of suitable spacer materials include copper alloys, aluminum alloys or the like. It will be appreciated that spacer plates 102' may be comprised of differing materials so as to offer only thermal compensation or only improving structural integrity or both.

Figure 12:
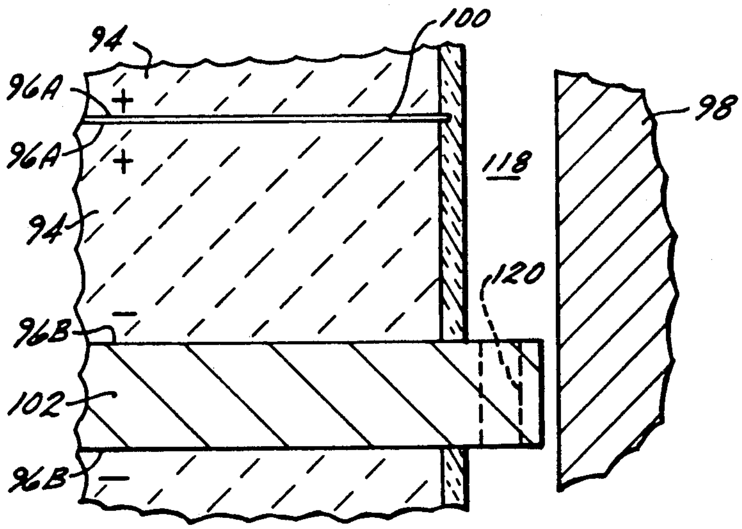
FIG. 12 is an enlarged cross-sectional elevation view depicting a method of cooling the ceramic stack assembly of FIG. 7.

Turning now to FIG. 12, a preferred method of conducting heat away from ground electrodes 96B and which does not require direct contact with the wall of steel casing 106 is shown. In this embodiment of the present invention, each spacer plate 102 extends outwardly from stack 90 and into a fluid filled cavity 118. In addition, the fluid should have adequate properties for preventing electrical arcing such as Fluoro-Inert manufactured by DuPont. Each ground electrode 96B extends along the opposed outer surfaces of spacer 102 and into the fluid filled cavity 118. Each ground electrode 96B is thus exposed to a cooling fluid which occupies the cavity 118 between stack 90 and the steel casing 106. Preferably, a plurality of holes 120 are drilled through the plate 102 to facilitate greater contact with the fluid and increased convection. Electrical connection between driving potential electrodes and ground potential electrodes are effected as shown in FIG. 9. Fluid cavity 118 may be a closed cavity wherein drilling vibration will contribute to convection, especially if the cavity is only partially filled with fluid.

Figure 13:
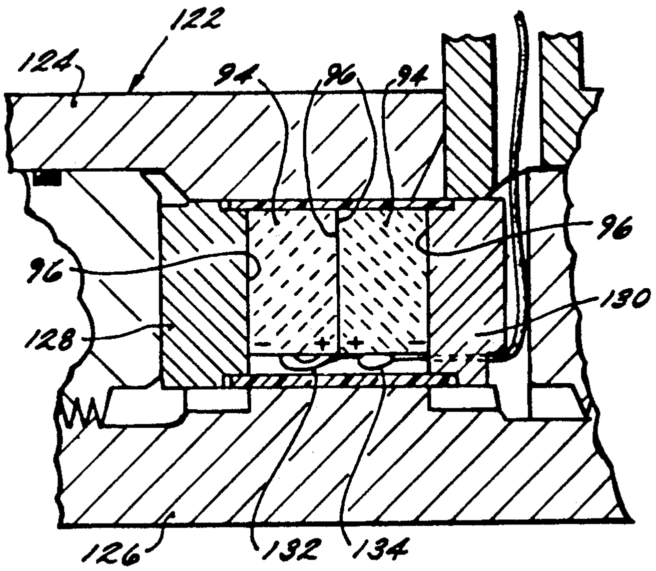
FIG. 13 is a cross-sectional elevation view of the transducer of FIG. 7 employed as an acoustic receiver.

It will be appreciated from the foregoing description of the acoustic transducer 92, that the modular nature of this transducer permits flexibility in its utility which will encompass both pulse mode and continuous wave transmission schemes. Thus, the transducer of the present invention can also be used as a receiving transducer, for example, to provide the function of items 52, 54 and 62, 64 in FIG. 5. Referring to FIG. 13, only two ceramic disks are needed for use of the transducer in a receiving mode. As the transmitting transducer of FIG. 7, in the receiving transducer of FIG. 13, ceramic disks 94 are housed in a jacket 122 defined by a pair of spaced steel cylinders 124, 126. Brass plugs 128, 130 abut each end of the ceramic stack and wire conductors 132, 134 interconnect respective electrodes 96. The voltage of electrodes 96A are connected to a high impedance load and allowed to change in response to the strain which is induced by a passing elastic wave. A significant advantage of the disk assembly of FIG. 13 is that it is not sensitive to bending or torsional motion of the drillstring. Therefore, this disk assembly discriminates between true communication signals which produce only axial motion in the drillstring and false noise signals resulting from bending and torsional motion.

Figure 14:
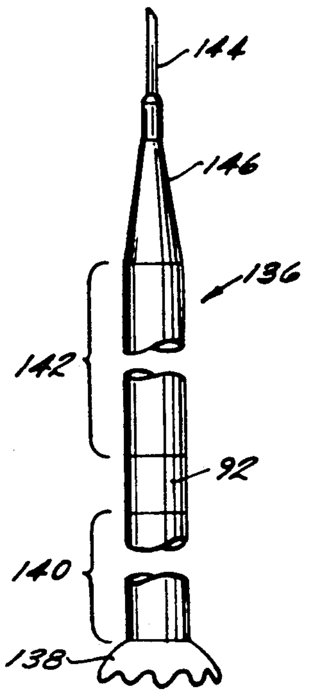
FIG. 14 is a side elevation view of a drilling assembly incorporating the transducer of FIG. 7 and a tapered transition section.

Transducer 92 may be utilized in several operating modes. One operating mode is shown in FIG. 5 and described in detail above. An alternative mode of operation is depicted in FIG. 14. In this latter operative mode, transducer 92 is placed a short distance from the bottom end of the drillstring 136. A drill bit 138 (which is normally a rolled cone bit) provides a poor acoustical coupling with the natural formation which is being drilled. The small section 140 of drill collar 136 between bit 138 and transducer 92 is effectively a quarter wave sub which then tunes transducer 92 to the desired transmission frequency. This increases the signal strength into the drill collar section 142 above transducer 92 and thereby provides high amplitude energy waves which can be used for base band communication.

Figure 15:
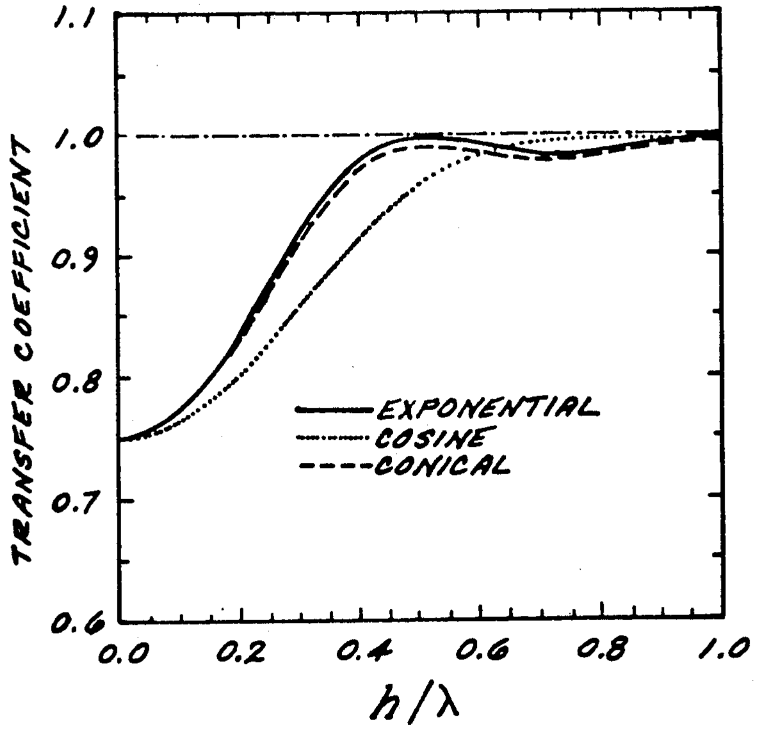
FIG. 15 is a graph depicting the performance of the transition segment of FIG. 11.

Still referring to FIG. 14, the acoustical data signal which travels up drill collar 142 will eventually reach the intersection between drill collar 142 and drill pipe 144. This intersection, which normally comprises an abrupt change in cross sectional area, can cause significant reflection of the acoustic data signal. In accordance with the present invention, this signal reflection can be significantly reduced by employing a transition segment 146 between the upper section 142 of drill collar 136 and the smaller diameter drillstring 144. Transition segment 146 may simply comprise a tapered section of drill collar. The performance of a transition segment is illustrated in FIG. 15. FIG. 15 provides the fraction of total acoustic energy transmitted from a drill collar segment of a first diameter to a drill collar segment of a second diameter. This quantity is plotted as a function of the ratio of the length of the transition segment h over the wavelength $\lambda$. Three results are plotted in FIG. 15 corresponding to conical, exponential and cosine tapers. Typical frequencies employed in transmission pulses may be 20 feet. The length of the transition segment would be 10 to 20 feet. This transition segment would increase the received signal level by about 3 dB, but more importantly, it would reduce the echo to signal level by 6 dB.

An important feature of this invention is that the data signals are generated as continuous waves as opposed to a pulse mode of operation such as described in U.S. Pat. No. 4,298,970 to Shawhan et al. Unlike the present invention which utilizes a continuous wave mode of operation combined with active echo suppression, Shawhan et al uses a pulse mode and does not actively suppress echos. Instead, Shawhan et al uses spaced repeaters in an attempt to let the echos naturally attenuate.

The particular sizes and equipment discussed above are cited merely to illustrate a particular embodiment of this invention. It is contemplated that the use of the invention may involve components having different sizes and shapes as long as the principle set forth in the claims is followed. It is intended that the scope of the invention be defined by the claims appended hereto. A more detailed explanation of the calculations behind this invention, and results of scale model tests and evaluations of field data, are provided in the appendix attached to this disclosure.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An electromechanical transducer comprising:

a tubular drill collar segment having a selected coefficient of thermal expansion;

a stack of ferroelectric ceramic disks housed in said drill collar segment and having a selected coefficient of thermal expansion;

electrodes interleaved in said stack of disks, said electrodes being connected to ground potential and driving potential so as to electrically pole said disks and thereby induce or receive acoustic waves in said drill collar segment; and a spacer plate between at least two of said disks, said spacer plate being comprised of a material which;

(a) is softer than said ceramic disks and has an effective thickness so as to reduce structural stresses upon said ceramic disks when said ceramic disks are subjected to bending and torsion forces; and (b) has a selected coefficient of thermal expansion which, when combined with said coefficient of thermal expansion of said ceramic disks, is substantially equivalent to said coefficient of thermal expansion of said tubular drill collar segment.

2. The transducer of claim 1 wherein said material comprises a copper or aluminum alloy.

3. An electromechanical transducer comprising:

a tubular drill collar segment;

a stack of ferroelectric ceramic disks housed in said drill collar segment;

electrodes interleaved in said stack of disks, said electrodes being connected to ground potential and driving potential so as to electrically pole said disks and thereby induce or receive acoustic waves in said drill collar segment;

a spacer plate between at least two of said disks, said spacer plate being comprised of a material which is softer than said ceramic disks and has an effective thickness so as to reduce structural stresses upon said ceramic disks; and wherein said material comprises;

a copper or aluminum alloy.

* * * * *